United States Patent
Bhattacharya et al.

(10) Patent No.: US 12,093,316 B2
(45) Date of Patent: Sep. 17, 2024

(54) PARTIAL FILE SYSTEM INSTANCES

(71) Applicant: HEWLETT PACKARD ENTERPRISE DEVELOPMENT LP, Houston, TX (US)

(72) Inventors: Suparna Bhattacharya, Bangalore (IN); Annmary Justine Koomthanam, Bangalore (IN); John Michael Czerkowicz, Westborough, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 297 days.

(21) Appl. No.: 16/263,390

(22) Filed: Jan. 31, 2019

(65) Prior Publication Data
US 2020/0250232 A1 Aug. 6, 2020

(51) Int. Cl.
*G06F 16/90* (2019.01)
*G06F 9/455* (2018.01)
(Continued)

(52) U.S. Cl.
CPC ...... *G06F 16/9027* (2019.01); *G06F 9/45558* (2013.01); *G06F 16/192* (2019.01);
(Continued)

(58) Field of Classification Search
None
See application file for complete search history.

(56) References Cited

U.S. PATENT DOCUMENTS

| | | | |
|---|---|---|---|
| 6,643,670 B2 * | 11/2003 | Parham | G06F 16/278 707/610 |
| 6,745,209 B2 * | 6/2004 | Holenstein | G06F 16/2343 707/615 |

(Continued)

FOREIGN PATENT DOCUMENTS

| | | |
|---|---|---|
| EP | 1845448 A2 | 10/2007 |
| WO | 2010/033552 A1 | 3/2010 |

(Continued)

OTHER PUBLICATIONS

Ranganathan, Sundar, "Edge to Core to Cloud Architecture for AI", Technical White Paper, NetApp, WP-7271, Aug. 2018, 13 pages.
(Continued)

*Primary Examiner* — Kris E Mackes
*Assistant Examiner* — Cao D Vuong
(74) *Attorney, Agent, or Firm* — Trop, Pruner & Hu, P.C.

(57) ABSTRACT

Example implementations relate to partial file system instances. In an example, a subset of objects of a source file system instance on a source system are replicated to a target system to form a partial file system instance on the target system comprised of the subset of objects. Each of the objects of the source file system instance is identified by a signature based on content of each of the objects and the objects exhibit a hierarchical relationship to a root object in the file system instance. An unmaterialized object is dynamically added to the partial file system instance by replicating the corresponding object from the source file system instance. The target system is asynchronously updated from
(Continued)

the source file system instance based on a comparison of the partial file system instance to the source file system instance.

17 Claims, 8 Drawing Sheets

(51) Int. Cl.
   *G06F 16/188* (2019.01)
   *G06F 16/27* (2019.01)
   *G06F 16/901* (2019.01)
   *G06F 16/908* (2019.01)
(52) U.S. Cl.
   CPC .......... *G06F 16/273* (2019.01); *G06F 16/908* (2019.01); *G06F 2009/45595* (2013.01)

(56) References Cited

U.S. PATENT DOCUMENTS

| | | | |
|---|---|---|---|
| 6,981,005 B1 | 12/2005 | Cabrera et al. | |
| 7,873,982 B2 | 1/2011 | Smith et al. | |
| 7,962,458 B2* | 6/2011 | Holenstein | G06F 16/2343 |
| | | | 707/704 |
| 8,250,033 B1 | 8/2012 | De et al. | |
| 8,417,907 B2 | 4/2013 | Urkude et al. | |
| 8,478,799 B2 | 7/2013 | Beaverson et al. | |
| 8,484,259 B1* | 7/2013 | Makkar | G06F 16/907 |
| | | | 707/769 |
| 8,788,769 B2 | 7/2014 | Abercrombie et al. | |
| 9,372,757 B2* | 6/2016 | Cantwell | G06F 11/1451 |
| 9,411,749 B2 | 8/2016 | Boeuf et al. | |
| 9,495,373 B2 | 11/2016 | Gheith et al. | |
| 9,705,730 B1 | 7/2017 | Petri et al. | |
| 9,720,620 B1* | 8/2017 | Wei | G06F 3/067 |
| 9,798,791 B1* | 10/2017 | Zhang | G06F 16/178 |
| 9,979,590 B2 | 5/2018 | Marchese | |
| 10,437,682 B1* | 10/2019 | Jonnala | G06F 16/182 |
| 10,496,701 B2 | 12/2019 | Abeloe et al. | |
| 10,884,993 B1* | 1/2021 | Grunwald | G06F 11/2082 |
| 11,036,677 B1* | 6/2021 | Grunwald | G06F 3/067 |
| 2002/0087552 A1* | 7/2002 | Applewhite | G06F 21/6263 |
| 2006/0053121 A1* | 3/2006 | Zizys | G06F 11/1458 |
| | | | 714/E11.122 |
| 2011/0010333 A1* | 1/2011 | Vasudevan | G06F 16/907 |
| | | | 707/E17.055 |
| 2011/0060753 A1 | 3/2011 | Shaked et al. | |
| 2011/0191295 A1 | 8/2011 | Ozdemir et al. | |
| 2011/0213781 A1* | 9/2011 | Hansel | G06F 16/273 |
| | | | 707/754 |
| 2012/0023066 A1* | 1/2012 | Bourbonnais | G06F 16/256 |
| | | | 707/613 |
| 2012/0030172 A1* | 2/2012 | Pareek | G06F 16/275 |
| | | | 707/635 |
| 2012/0166396 A1 | 6/2012 | Yamagami | |
| 2014/0040199 A1 | 2/2014 | Golab et al. | |
| 2014/0189576 A1 | 7/2014 | Carmi | |
| 2014/0258233 A1* | 9/2014 | Ducott, III | G06F 16/27 |
| | | | 707/634 |
| 2014/0337685 A1 | 11/2014 | Baptist et al. | |
| 2015/0019495 A1 | 1/2015 | Siden et al. | |
| 2015/0142745 A1 | 5/2015 | Tekade et al. | |
| 2015/0212893 A1 | 7/2015 | Pawar et al. | |
| 2015/0212897 A1 | 7/2015 | Kottomtharayil et al. | |
| 2016/0014008 A1 | 1/2016 | Metts et al. | |
| 2016/0162550 A1* | 6/2016 | Wang | G06F 16/258 |
| | | | 707/602 |
| 2016/0196324 A1* | 7/2016 | Haviv | G06F 3/0685 |
| | | | 707/649 |
| 2016/0202927 A1 | 7/2016 | Klarakis et al. | |
| 2016/0259794 A1 | 9/2016 | Hickman et al. | |
| 2017/0279901 A1* | 9/2017 | Carricarte | G06F 16/273 |
| 2018/0109812 A1 | 4/2018 | Tsai et al. | |
| 2018/0293137 A1 | 10/2018 | Akutsu et al. | |
| 2019/0102103 A1* | 4/2019 | Ari | G06F 3/0683 |
| 2019/0155699 A1 | 5/2019 | Luo et al. | |
| 2019/0354628 A1* | 11/2019 | Grunwald | G06F 3/067 |
| 2020/0019629 A1* | 1/2020 | Shilane | G06F 16/2329 |

FOREIGN PATENT DOCUMENTS

| | | |
|---|---|---|
| WO | 2013/035295 A1 | 3/2013 |
| WO | 2014/025594 A1 | 2/2014 |

OTHER PUBLICATIONS

Mouratidis et al., "Partially Materialized Digest Scheme: An Efficient Verification Method for Outsourced Databases", The International Journal on Very Large Data Bases, vol. 18, 2009, 19 pages.
Aung et al., "Back Up Azure Unmanaged VM Disks with Incremental Snapshots", (Web Page), available online at <https://docs.microsoft.com/en-us/azure/virtual-machines/windows/incremental-snapshots>, Jan. 23, 2017, 7 pages.
Robert Sheldon, "Why an edge computing platform benefits from HCI", available online at <https://searchconvergedinfrastructure.techtarget.com/tip/Why-an-edge-computing-platform-benefits-from-HCI?vgnextfmt=print>, Dec. 19, 2017, 2 pages.
Jason Collier, "Edge Computing and the Growth of Hyperconverged Solutions Over the Cloud in 2018", available online at <https://www.dataversity.net/edge-computing-growth-hyperconverged-solutions-cloud-2018/#>, Jan. 29, 2018, 6 pages.
Christy Pettey, "4 Factors Shape the Future of Hyperconverged Infrastructure", available online at <https://www.gartner.com/smarterwithgartner/4-factors-shape-the-future-of-hyperconverged-infrastructure/>, Jun. 11, 2018, 10 pages.
Andrew Tridgell et al., "rsync", Jan. 28, 2018, 34 pages, retrieved from internet archive at <https://web.archive.org/web/20181213070402/https://download.samba.org/pub/rsync/rsync.html>.
Jarret W. Buse et al., "DMAPI (Data Management API)", linux.org, Jul. 22, 2013, 3 pages, retrieved from internet <https://www.linux.org/threads/dmapi-data-management-api.8785/>.
Lennart Poettering, "casync—A tool for distributing fi le system images", Jun. 2017, 14 pages, retrieved from internet <http://0pointer.net/blog/casync-a-tool-for-distributing-file-system-images.html>.
Matt Passel et al., "How can I rsync a set of subdirectories?", Superuser, Jun. 2014, 3 pages, retrieved from internet <https://superuser.com/questions/775140/how-can-i-rsync-a-set-of-subdirectories>.
Hernandez, Pedro, "Block Storage vs Object Storage: Difference & Uses," available online at <https://www.enterprisestorageforum.com/hardware/block-storage-vs-object-storage/>, May 9, 2018, 5 pages.

* cited by examiner

PARTIAL FILE SYSTEM INSTANCES

BACKGROUND

Computing systems may be connected over a network. Data may be transmitted between the computing systems over the network for various purposes, including processing, analysis, and storage. Computing systems may operate data virtualization platforms that control how data is stored.

BRIEF DESCRIPTION OF THE DRAWINGS

Various examples will be described below with reference to the following figures.

DETAILED DESCRIPTION

Figure 1:
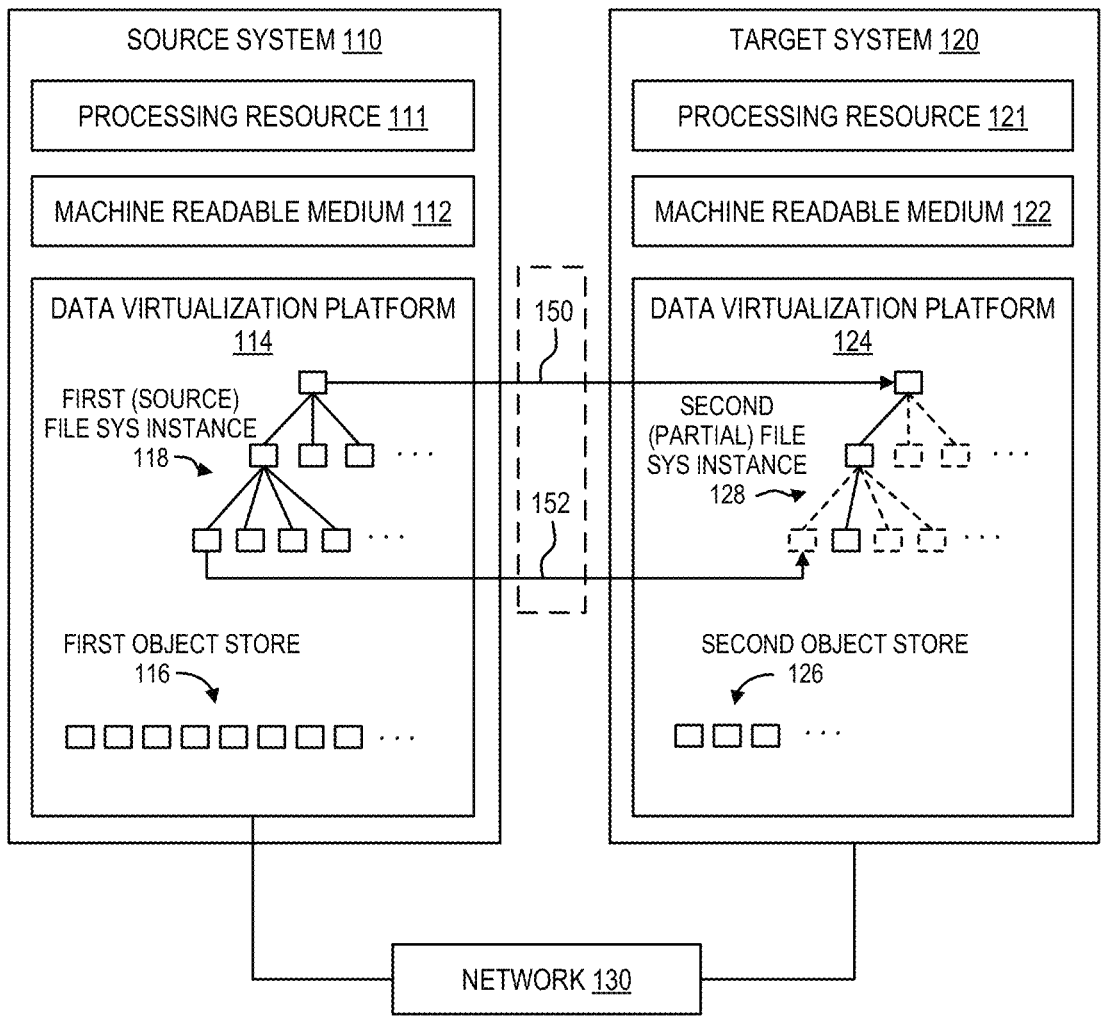
FIG. 1 illustrates an example source system and an example target system where objects of the source file system are replicated to form a partial file system instance on a target system.

Data may be stored on a computing system, such as a server, a cluster of servers, a computer appliance, a workstation, a storage system, a converged or hyperconverged system, or the like. In some cases, it may be useful to transmit the data or a copy of the data from a source system to another computing system, i.e., a target system, via any wired or wireless network connection. In particular, the source system may be at an edge of a network where data is generated, and the target system may be at the core (e.g., data center) where data is analyzed. To store data, some computing systems may utilize a data virtualization platform that abstracts aspects of the physical storage hardware on which the data is physically stored (e.g., aspects such as addressing, configurations, etc.) and presents virtualized or logical storage to a user environment (e.g., operating system, applications, processes). The virtualized storage may be pooled from multiple storage hardware (e.g., hard disk drives, solid state drives, etc.). The data virtualization platform may also provide data services such as deduplication, compression, replication, and the like.

In some instances, a data virtualization platform may be object-based. An object-based data virtualization platform may be different from block level storage (e.g., implemented in storage area networks and presented via a storage protocol such as iSCSI or Fibre Channel) and file level storage (e.g., a virtual file system which manages data in a file hierarchy and is presented via a file level protocol such as NFS or SMB/CIFS), although an object-based data virtualization platform may underlie block or file level storage protocols in some implementations. In an object-based platform, data may be stored as objects in an object store. User accessible files and directories may be made up of multiple objects. Each object may be identified by a signature (also referred to as an object fingerprint), which, in some implementations, may include a cryptographic hash digest of the content of that object. The signature can be correlated to a physical address (disk location) of the object's data in an object index.

Objects may be hierarchically related to a root object in an object tree (e.g., a Merkle tree) or any other hierarchical arrangement (e.g., directed acyclic graphs, etc.). The hierarchical arrangement of objects is referred to herein as a file system instance. In the case of a hierarchical tree, the lowest level tree node of any branch (that is, most distant from the root object) is a data object that stores user data, also referred to as a leaf data object. The parent tree node of leaf data objects is a leaf metadata object that stores as its content the signatures of its child leaf data objects. The root and internal nodes of a tree may also be metadata objects that store as content the signatures of child objects. A metadata object may be able to store a number of signatures that is at least equal to a branching factor of the hierarchical tree, so that it may hold the signatures of all of its child objects. In some implementations, data objects may be larger in size than metadata objects. For example, metadata objects may be 1 kibibyte (kib) while data objects may be 4 or 8 kib.

As mentioned above, it may be useful to transmit data to a target system. In the case of an object-based data virtualization platform, the hierarchical file system instance provides a self-consistent unit for clone, backup, and restore operations, which could be useful for transmitting data to a target system. However, it may be inefficient in terms of time, cost, network bandwidth, etc. to replicate an entire file system instance, which may include a substantial amount of historical data, even when the replication is an incremental backup. For example, a workload on the target system (e.g., an analytics or data processing application) may only need a portion of the data of the source system, such as data from a particular time interval of interest or data in a specific file or directory (e.g., a directory storing Apache Kafka logs).

Thus, it may be useful to initially replicate a subset of the objects of a file system instance corresponding to the data of interest to a target system. Examples disclosed herein may relate to, among other things, initially replicating a subset of objects of a source file system to a target system to form a partial file system instance on the target system. Objects replicated to the target system may be deemed "materialized" in the partial file system instance, and objects not replicated to the target system with the initial subset of objects may be deemed "unmaterialized" in the partial file system instance. Various examples provide for replicating different subsets of objects depending on the type of data requested at the target system. Unmaterialized objects can be dynamically materialized (added) to the partial file system instance by replicating the corresponding objects from the source file system instance. The target system is asynchronously updated from the source file system instance based on a comparison of the partial file system instance to the source file system instance.

By replicating a partial file system instance, the target system may perform processing or analysis on data of interest without a more costly replication of an entire file system instance from the source system. Thus, a data set may be available for use at the target system sooner, such as in seconds to minutes rather than minutes to hours, depending on the size of the data set. Moreover, unmaterialized objects may be efficiently pulled by or pushed to the target system on an as-needed basis or on other conditions. As such, network bandwidth and storage space utilization are reduced or moderated, compared to a full replication.

FIG. 1 illustrates an example environment 100 that includes a source system 110 and a target system 120 in communication with each other via a network 130. The source system 110 or target system 120 may be a server, a computer appliance, a workstation, a storage system, a converged or hyperconverged system, or the like. In some implementations, the source system 110 or the target system 120 may be a cluster of server nodes.

The source system 110 and the target system 120 include respective processing resources 111, 121 and respective machine readable media 112, 122. For example, a processing resource may include a microcontroller, a microprocessor, central processing unit core(s), an application-specific integrated circuit (ASIC), a field programmable gate array (FPGA), etc. A machine readable medium may be non-transitory and include random access memory (RAM), read-only memory (ROM), electrically erasable programmable read-only memory (EEPROM), flash memory, a hard disk drive, etc. A processing resource may execute instructions (i.e., programming or software code) stored on machine readable medium. Additionally or alternatively, a processing resource may include electronic circuitry for performing the functionality of instructions described herein.

The network 130 may include any wired or wireless (e.g., Ethernet, optical fiber, Wi-Fi®, etc.). In some implementations, the source system 110 may be located at the edge of the network 130, and the target system 120 may be at or near a core of the network 130, such as in a data center.

The source system 110 operates a first object-based data virtualization platform 114 (also referred to as first data virtualization platform 114). Similarly, the target system 120 operates a second object-based data virtualization platform 124 (also referred to as second data virtualization platform 124), which may be analogous in many respects to the first data virtualization platform 114. The data virtualization platform 114 may be created and maintained on the source system 110 by the processing resource 111 executing software instructions stored on the machine readable medium 112. The data virtualization platform 124 may be created and maintained on the target system 120 by the processing resource 121 executing software instructions stored on the machine readable medium 122. In some implementations, instructions stored on machine readable medium described herein (e.g., FIGS. 2, 4, 7, 10) may be integrated in the software instructions executed to operate the data virtualization platforms 114, 124.

The first data virtualization platform 114 may include a first object store 116 that stores objects, including data objects and metadata objects. The objects of the object store 116 are identifiable by content-based signatures. For example, the signature of an object may be a cryptographic digest of the content of that object, using a hash function such as SHA-1, SHA-256, MD5, etc. The first data virtualization platform 114 maintains a first file system instance 118 that describes the hierarchical relationships between at least some of the objects of the object store 116. For example, the first file system instance 118 may be a tree with a root object having a signature that identifies the entire first file system instance 118 at a point in time. Objects at the leaf level of the tree are data objects. Objects at levels of the tree above the leaf level may be metadata objects containing signatures of child objects, and may be referred to as leaf metadata objects. In some implementations, data objects may be larger in size (e.g., 4 or 8 kib) than metadata objects (e.g., 1 kib). In some examples, the data virtualization platform 114 may maintain multiple file system instances. The objects in the object store 116 may be referenced in one or more file system instances. The data virtualization platform 114 may export a file protocol mount point (e.g., an NFS or SMB mount point) by which an operating system on the source system 110 can access the storage provided by file system instances via the namespace of the file protocol. A file at the file protocol level (e.g., user documents, a computer program, etc.) may be made up of multiple data objects within the data virtualization platform 114.

Similar to the first data virtualization platform 114, the second data virtualization platform 124 may include a second object store 126 for storing data and metadata objects that are organized into file system instances of the target system 120.

It may be useful to replicate (i.e., copy) data from the source system 110 to the target system 120. For example, the source system 110 may collect sensor data that is transmitted to the target system 120 for storage and/or analysis. As noted above however, it may be more efficient to transmit a less-than-full set of data from the source system 110, such as the minimum data requested for the target system 120. Various implementations of such an operation in environment 100 will now be described.

Figure 2:
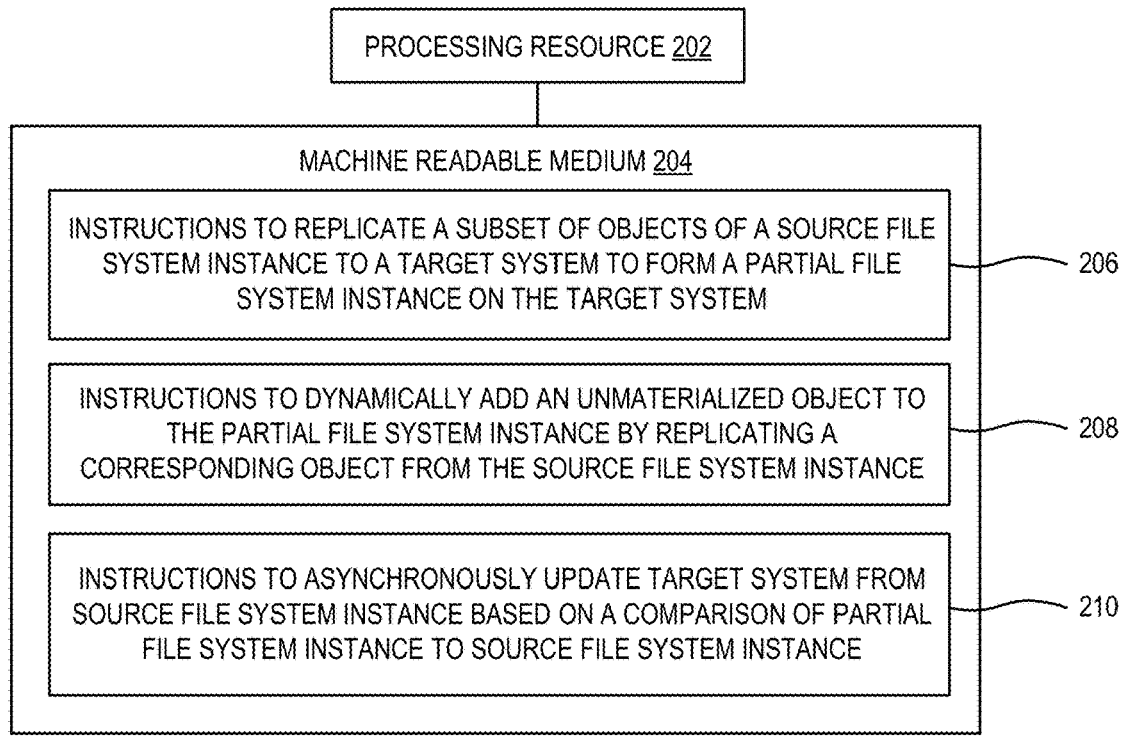
FIG. 2 is a block diagram depicting a machine readable medium encoded with example instructions to replicate a subset of objects to form a partial file system instance.

FIG. 2 depicts a processing resource 202 coupled to a non-transitory, machine readable medium 204 encoded with example instructions 206, 208, 210. The processing resource 202 and machine readable medium 204 may be disposed within a system (e.g., a server or the like, such as source system 110 or target system 120), in which case the executable instructions may be deemed "installed" on or "embedded" in the system. Alternatively, the machine readable medium 204 may be a portable (e.g., external) storage medium and may be part of an "installation package." For example, the machine readable medium 204 may serve as one or both of medium 112 or 122 of FIG. 1. Moreover, the instructions of medium 204 may be executed by the source system 110, the target system 120, or by the source system 110 and the target system 120 in a cooperative, distributed, or sequential manner.

Instructions 206, when executed, cause the processing resource 202 to replicate (i.e., copy) a subset of objects from the first object store 116 that are in the first file system instance 118 (which may also be referred to as source file system instance 116) to the target system 120 to form a second file system instance 128 on the target system 120 that is a partial version of the first file system instance 118 (which may also be referred to as partial file system instance 128). For example, the source system 110 may transmit the subset of objects over the network 130 to the target system 120. The source system 110 may push the subset of objects, in which case the source system 110 executes at least part of instructions 206, or the target system 120 may pull the subset of objects, in which case the target system 120 executes at least part of instructions 206.

To illustrate, FIG. 1 shows a root object of file system instance 118 being replicated 150 to target system 120, and both objects are illustrated in solid lines in their respective file system instances. Objects replicated by instructions 206 may also be stored in the object store 126 of the target system 120. In other words, replicated objects have been "materialized" on the target system 120. Other objects of the source file system instance 118 are not replicated to the target system 120 initially, as indicated by dashed boxes in the partial file system instance 128, and thus are deemed "unmaterialized" objects. The partial file system instance may also be referred to as a "partially materialized file system instance". In this manner, the partial file system instance 128 is initially a partial version of the source file system instance 118.

As described above, a file at the file protocol level may be actually composed of multiple data objects within a data virtualization platform. A file may also be associated with multiple metadata objects. Thus, the subset of objects replicated to the target system 120 may not represent an entire file in some instances. In other words, some of the objects associated with a file may not be materialized on the target system 120. In this manner, replicating the subset of objects to form a partial file system instance 128 on a target system 120 differs from other partial replication techniques, such as replicating a subset of a plurality of files (i.e., replication at the file protocol level). In those instances, the files that are replicated are replicated in their entirety, as opposed to a possible partial materialization of constituent objects.

In some implementations, the subset of objects may be as minimal as a single object, such as the root object of the source file system instance 118. In some implementations, the subset of objects does not include data objects referenced by the source file system instance 118, which may lend to efficiencies of the partial file system instance where data objects are larger than metadata objects. Multiple criteria and techniques may be implemented to select the objects that form the subset of objects for replication, as will be discussed further herein below.

Referring again to FIG. 2, instructions 208, when executed, cause the processing resource 202 to dynamically add an unmaterialized object to the partial file system instance 128 by replicating the corresponding object from the source file system instance 118 (and more particularly, from the first object store 116). In other words, an object of the source file system instance 118 that corresponds to an unmaterialized object of the partial file system instance 128 is replicated to the target system 120 to materialize the unmaterialized object. To "dynamically" add the unmaterialized object may mean that the object is replicated sometime after the initial partial replication of the source file system instance 118 to the target system 120. The dynamic replication may be on-demand (as requested by the target system 120), scheduled in advance, or according to other programmatic circumstances. To illustrate, FIG. 1 shows a replication 152 of a lower level object of the source file system instance 118 to the target system 120. In some implementations, the source system 110 may push the object, or the target system 120 may pull the object.

Referring again to FIG. 2, in some implementations, instructions 208 may be executed when the unmaterialized object is needed by a process at the target system 120. For example, instructions 208 may be triggered in response to an object lookup at the target system 120 involving the unmaterialized object, such as when traversing the file system instance tree 128 during a read operation to locate a data object and arriving at an unmaterialized metadata object in the hierarchy that does not exist on the target system 120.

In some implementations, a plurality of unmaterialized object requests may batched by the target system 120 to avoid handling separate, individual object requests and lookups at the source system. In some implementations, the source system 110 may asynchronously send or prepare to send objects corresponding to unmaterialized objects to the target system 120. For example, the source system 110 may identify objects of the source file system instance 118 that are related to the subset of objects replicated by instructions 208 (e.g., objects at adjacent parent or child levels) and send or prepare to send them in advance of a request from the target system 120.

Instructions 210, when executed, cause the processing resource 202 to asynchronously update the target system 120 from the source file system instance 118 based on a comparison of the partial file system instance 128 and the source file system instance 118, and more particularly, the source file system instance 118 at a later point in time after updates (e.g., changes to objects) have been incurred since the partial file system instance 128 was generated by instructions 206. The update may be asynchronous, for example, in that the target system 120 may be updated at a timing that is decoupled or independent of changes made to the source file system instance 118.

In some implementations, the asynchronous updating by instructions 210 may create a new partial file system instance at the target system 120 according to a time-based policy. For example, the time-based policy may define that an update at the target system 120 is to occur at a configured interval (e.g., daily), and, at that interval, changes in the source file system instance 118 are identified relative to the partial file system instance 128 (which may reflect the source file system instance at an earlier point in time, e.g., a day ago, for a daily interval). Those changes may be identified by tree differencing logic, an example of which will be described further herein below (e.g., FIG. 7). The changes may serve as a new subset of objects for creating a new partial file system instance on the target system 120. In this manner, asynchronous updating may also execute some or all of instructions 206 and 208 to create the new partial file system instance.

Figure 3:
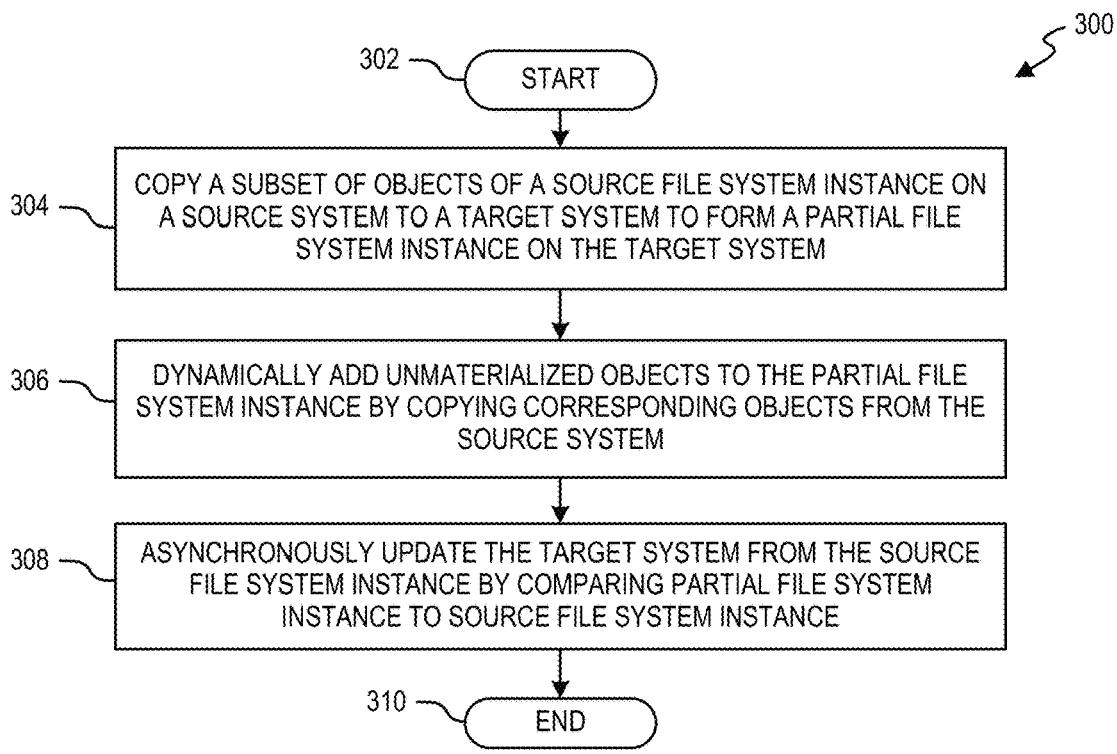
FIG. 3 is a flow diagram depicting an example method that copies a subset of objects to form a partial file system instance.

FIG. 3 is a flow diagram depicting an example method 300. In some implementations, one or more blocks of the methods described herein may be executed substantially concurrently or in a different order than shown. In some implementations, a method may include more or fewer blocks than are shown. In some implementations, one or more of the blocks of a method may, at certain times, be ongoing and/or may repeat.

The methods described herein may be implemented in the form of executable instructions stored on a machine readable medium and executed by a processing resource and/or in the form of electronic circuitry. For example, the methods may be performed in part or in whole by the source system 110 or the target system 120. Method 300 may be performed by execution of the instructions of medium 204 by processing resource 202.

Method 300 begins at block 302 and proceeds to block 304 where a subset of objects of a source file system instance on a source system is copied (replicated) to a target system to form a partial file system instance on the target system comprised of the subset of objects. In an implementation, the subset of objects may be metadata objects and may not include data objects referenced by the source file system instance (i.e., leaf data objects). Each of the objects of the source file system instance is identified by a signature based on content of the each of the objects and the objects exhibit a hierarchical relationship to a root object in the file system instance.

At block 306, unmaterialized objects are dynamically added to the partial file system instance by copying the corresponding objects from the source file system instance (more particularly, from the object store associated with the source file system instance). For example, block 306 may be performed in response to object lookups at the target system for the unmaterialized objects.

At block 308, the target system is asynchronously updated from the source file system instance based on a comparison of the partial file system instance to the source file system instance. Block 308 may include creating a new partial file system instance on the target system based on updates to the source file system instance, according to a time-based policy (e.g., update interval or other scheduling). At block 310, method 300 ends.

Figure 4:
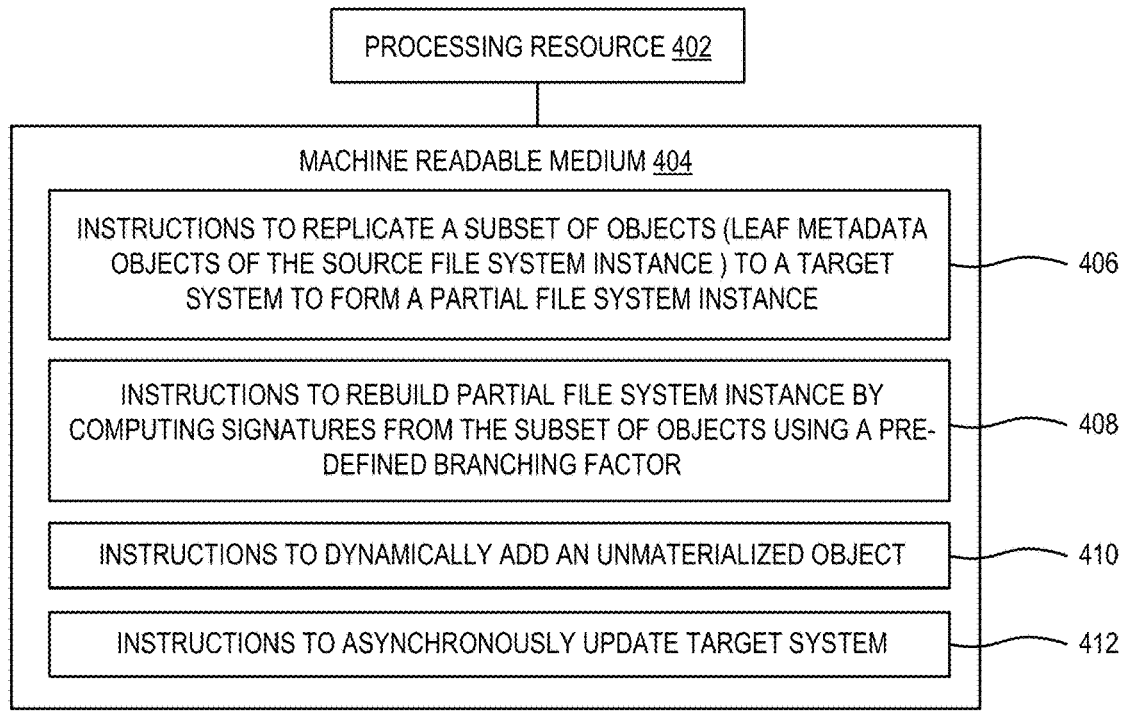
FIG. 4 is a block diagram depicting a machine readable medium encoded with example instructions to replicate leaf metadata objects to form a partial file system instance.

FIG. 4 depicts a processing resource 402 coupled to a non-transitory machine readable medium 404 encoded with example instructions 406, 408, 410, 412. The processing resource 402 and medium 404 may be implemented on the source system 110 and/or the target system 120. The instructions of FIG. 4 may be an implementation of generating a partial file system instance on a target system.

Instructions 406, when executed, cause the processing resource 402 to replicate a subset of objects of a source file system instance 118 to a target system 120 to form a partial file system instance 128. The subset of objects may be replicated from an object store 116 of the source system 110. Instructions 406 may be analogous to instructions 206 in some respects, and may provide additional techniques for selecting the subset of objects to be replicated. Instructions 406 cause the processing resource 402 to include in the subset of objects to be replicated the leaf metadata objects of the source file system instance 118 that contain signatures of data objects of the source system 110. In some implementations, instructions 406 also may include in the subset of objects to be replicated certain objects of the source file system instance 118 that include attributes associated with the leaf metadata objects, such as a height and/or offset of the leaf metadata objects within the source file system instance 118. In other implementations, attributes associated with the file or directory comprised of the replicated data objects may be transmitted to the target system 120 (e.g., logical size of a file, which may indicate the level of a leaf metadata object).

Instructions 408, when executed, cause the processing resource 402 to rebuild the partial file system instance 128 created by execution of instructions 406 by computing signatures from the subset of objects using, among other things, a pre-defined branching factor. As will be explained further below with reference to FIG. 6, signatures of leaf metadata objects can be computed (e.g., by calculating a cryptographic digest of the object contents) and collected into a new parent object in a quantity defined by the pre-defined branching factor. For example, the branching factor may be a constant of the data virtualization platforms 114, 124, and in some implementations, the branching factor may be the same for any given level of a file system instance under the root object. A new rebuilt parent object may store N-number child signatures for a data virtualization platform using a branching factor N. The same process of calculating signatures and collecting signatures into a new parent object may be repeated for each level until the root object is reached. In some implementations, information about the height or offset of a metadata object is utilized to determine how many parent levels are to be rebuilt.

Instructions 410 may be analogous in many respects to instructions 208. Instructions 412 may be analogous in many respects to instructions 210.

Figure 5:
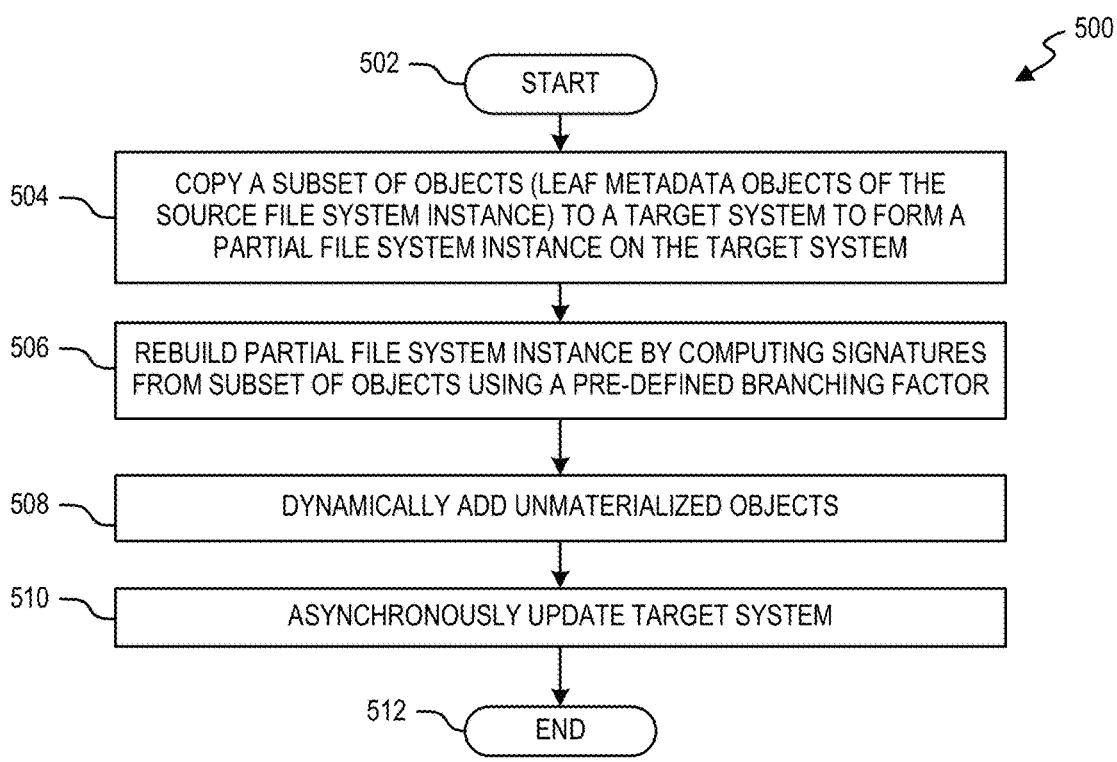
FIG. 5 is a flow diagram depicting an example method that copies leaf metadata objects to form a partial file system instance.

FIG. 5 is a flow diagram depicting an example method 500. Method 500 may be performed by execution of the instructions of medium 404 by processing resource 402.

Method 500 begins at block 502 and proceeds to block 504 where a subset of objects of a source file system instance on a source system is copied to a target system to form a partial file system instance on the target system. The subset of objects includes leaf metadata objects of the source file system instance that contain signatures of data objects of the source system.

At block 506, the partial file system is rebuilt by computing signatures from the subset of objects replicated by block 504 using a pre-defined branching factor.

At block 508, unmaterialized objects are dynamically added to the rebuilt partial file system instance in a manner analogous to block 306. At block 510, the target system is asynchronously updated from the source file system instance in a manner analogous to block 308. Method 500 ends at block 512.

Figure 6:
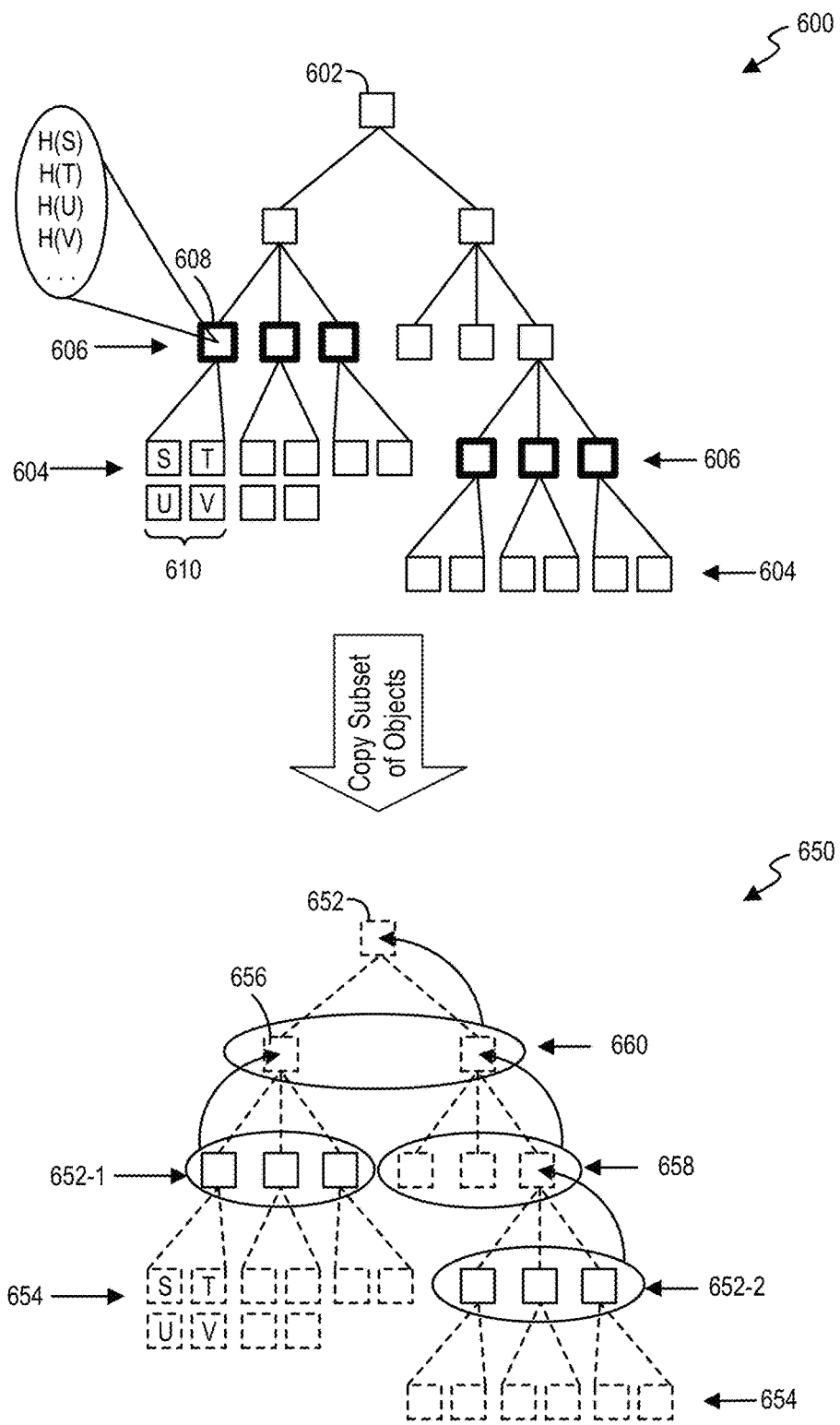
FIG. 6 depicts an illustration of a replicating leaf metadata objects and rebuilding a partial file system instance.

FIG. 6 illustrates an example of performing method 500 via execution of instructions 406-412. A source file system instance 600 includes a root signature 602 from which metadata objects and data objects 604 relate hierarchically. The number of branches and levels in file system instance 600 are for illustration purposes only. Greater or fewer number of branches and levels may exist in other example file system instances. Subtrees may have different numbers of levels. Leaf metadata objects 606 (depicted in bold lines) contain signatures of child data objects. For example, leaf metadata object 608 includes cryptographic hash signatures H(S), H(T), H(U), H(V) of child data objects 610 having data content S, T, U, V. Instructions 406 and block 504 of method 500 may be executed to include the leaf metadata objects 606 in a subset of objects to be replicated.

The replicated leaf metadata objects form a partial file system instance 650 on a target system. As indicated, the replicated leaf metadata objects 652-1 and 652-2 are shown in solid lines to indicate that they have been materialized on the target system (e.g., in the object store of the target system). In this example implementation, other objects of the source file system instance 600 have not been materialized on or replicated to the partial file system instance 650 of the target system as indicated by dashed line objects, including the child data objects 654, the parent objects 656 and 658 of respective leaf metadata objects 652-1, 652-2, other internal metadata objects 660, and the root signature 652.

The partial file system instance 650 may be rebuilt by execution of instructions 408 or block 506 of method 500. For example, the signatures of leaf metadata objects 652-1 are calculated and stored in object 656 and the signatures of leaf metadata objects 652-2 are calculated and stored in object 658. Similarly, signatures are calculated and stored for other leaf metadata objects not shown. The process is repeated upward until a signature is calculated for the root object 652. By virtue of the foregoing, the metadata objects of file system instance 650 are rebuilt. Unmaterialized data objects may be added dynamically.

Figure 7:
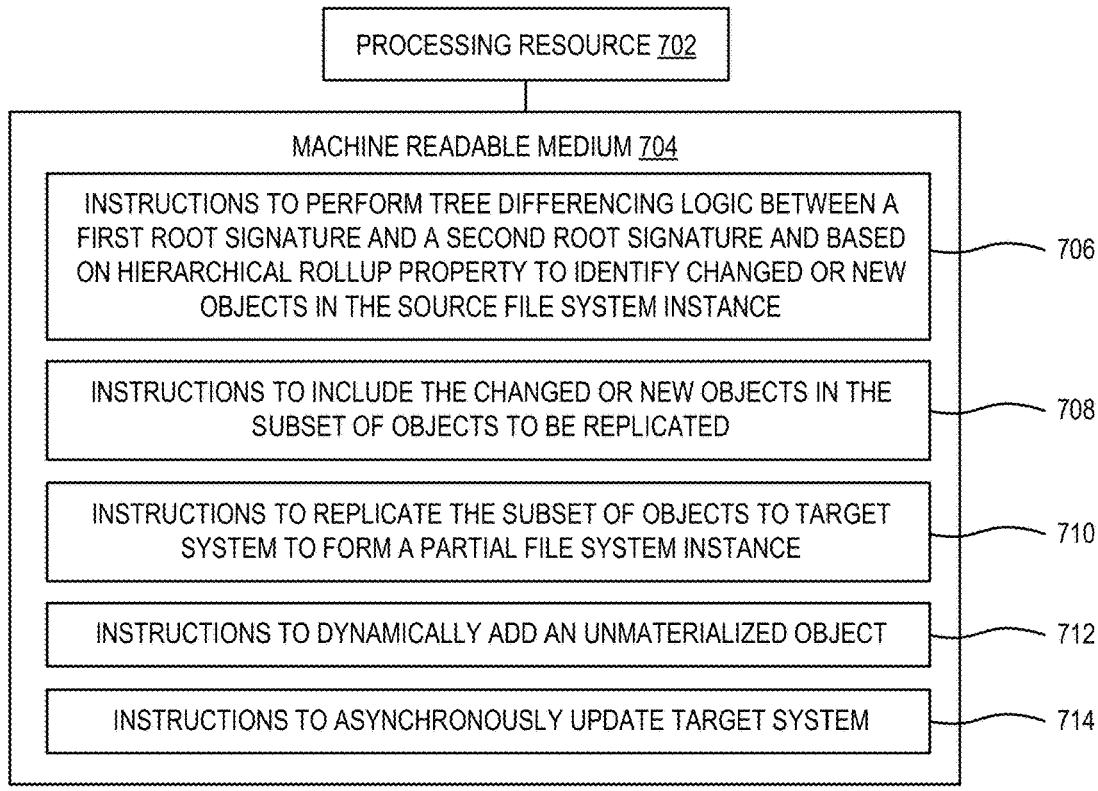
FIG. 7 is a block diagram depicting a machine readable medium encoded with example instructions to replicate new or changed objects to form a partial file system instance.

FIG. 7 depicts a processing resource 702 coupled to a non-transitory machine readable medium 704 encoded with example instructions 706, 708, 710, 712, 714. The processing resource 702 and medium 704 may be implemented on the source system 110 and/or the target system 120. The instructions of FIG. 7 may be an implementation of generating a partial file system instance on a target system.

Instructions 706, when executed, cause the processing resource 702 to perform tree differencing logic between a first root signature of a source file system instance 118 at a first point in time and a second root signature of the source file system instance 118 at a second point in time, based on hierarchical rollup property, to identify changed or new objects in the source file system instance 118 at the second point in time relative to the source file system instance 118 at the first point in time.

The first and second root signatures may be a product of a snapshot process of the data virtualization platform 114. In an example, the first root signature may represent a snapshot of the source file system instance at a past point in time (T1). T1 may be provided by user selection in an implementation, and the data virtualization platform 114 can identify and retrieve the corresponding root signature. In an example, the second root signature may represent the source file system instance 118 at a different past point in time (T2), and T2 also may be indicated by user selection. In another example, the second root signature may identify the source file system instance 118 at the present point in time (i.e., T0, the current version of the source file system instance), which also may be indicated by user selection.

Tree differencing logic may involve comparing signatures and content of corresponding objects of different snapshots of the file system instance represented by different root signatures. Since modification or addition of data objects will result in different cryptographic hash signatures of those objects, the hierarchical arrangement of the file system instance will propagate different signatures upwards to the root object, which may be referred to as the hierarchical rollup property. An example illustration will be described herein below with respect to FIG. 9.

In some implementations, the tree differencing logic may be performed by the source system 110. In some implementations, the tree differencing logic may be performed by the target system 120, particularly where a threshold number of objects associated with the first and second root signatures already exist on the target system 120 (e.g., if a partial file system instance was previously generated, and instructions 706 are being invoked as part of an asynchronous update of the target system, e.g., under instructions 210).

Instructions 708, when executed, cause the processing resource 702 to include the changed or new objects in a subset of objects to be replicated. Instructions 710, when executed, cause the processing resource 702 to replicate the subset of objects to a target system 120 to form a partial file system instance 128, in a manner similar to instructions 206 for example. Instructions 712 and 714 may be analogous in many respects to instructions 208 and 210 respectively.

In some implementations, the tree differencing logic of instructions 706 may be useful for identifying updates to the source file system 118 relative to a previously generated partial file system instance 128 for the purposes of performing an asynchronous update to the target system 120, as described above with respect to instructions 210 of FIG. 2 for example. As such, performing an asynchronous update (e.g., instructions 210, 412, 714) may execute at least part of instructions 706 and 708 in some examples.

Figure 8:
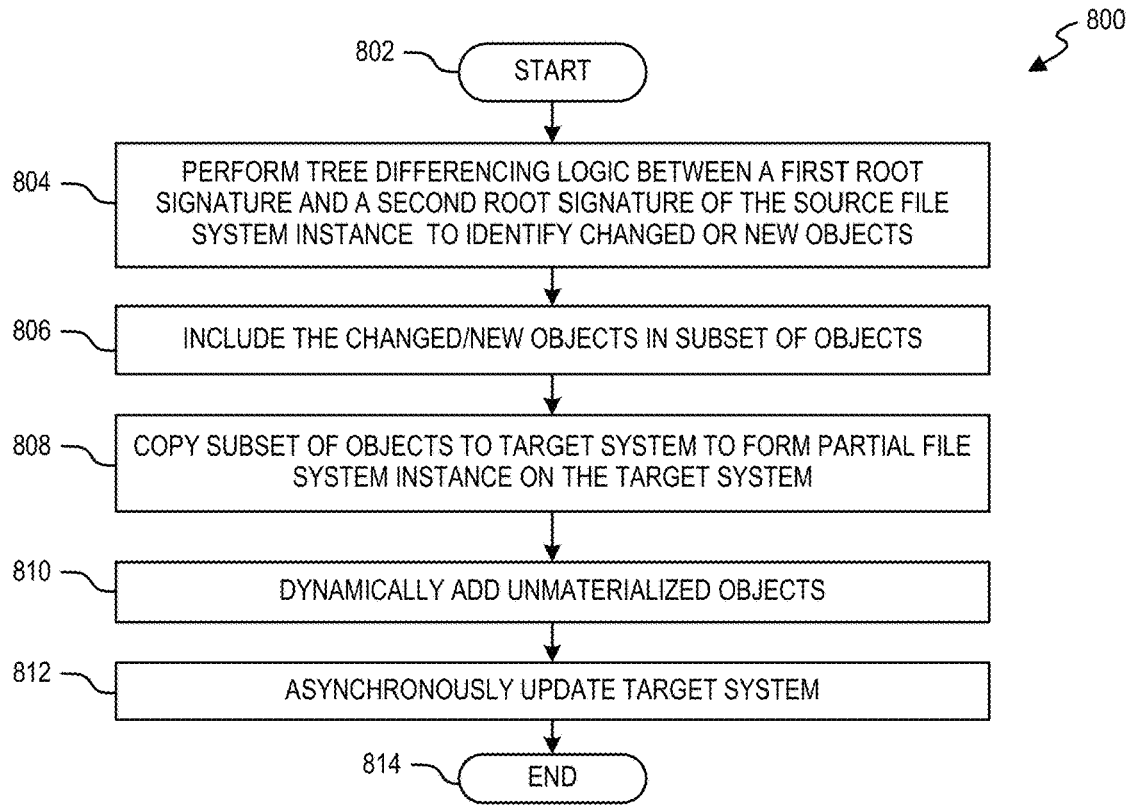
FIG. 8 is a flow diagram depicting an example method that copies new or changed objects to form a partial file system instance.

FIG. 8 is a flow diagram depicting an example method 800. Method 800 may be performed by execution of the instructions of medium 704 by processing resource 702.

Method 800 begins at block 802 and proceeds to block 804 where tree differencing logic is performed between a first root signature of the source file system instance and a second root signature of the source file system instance to identify changed or new objects between a first snapshot of the source file system instance represented by the first root signature and a second snapshot of the source file system instance represented by the second root signature. The tree differencing logic is based on the hierarchical rollup property as discussed above.

At block 806, the changed or new objects identified by the tree differencing logic are included in the subset of objects to be copied to the target system to form the partial file system instance. At block 808, the subset of objects is copied to a target system to form a partial file system instance on the target system.

At block 810, unmaterialized objects are dynamically added to the rebuilt partial file system instance in a manner analogous to block 306. At block 812, the target system is asynchronously updated from the source file system instance in a manner analogous to block 308. Method 800 ends at block 814.

Figure 9:
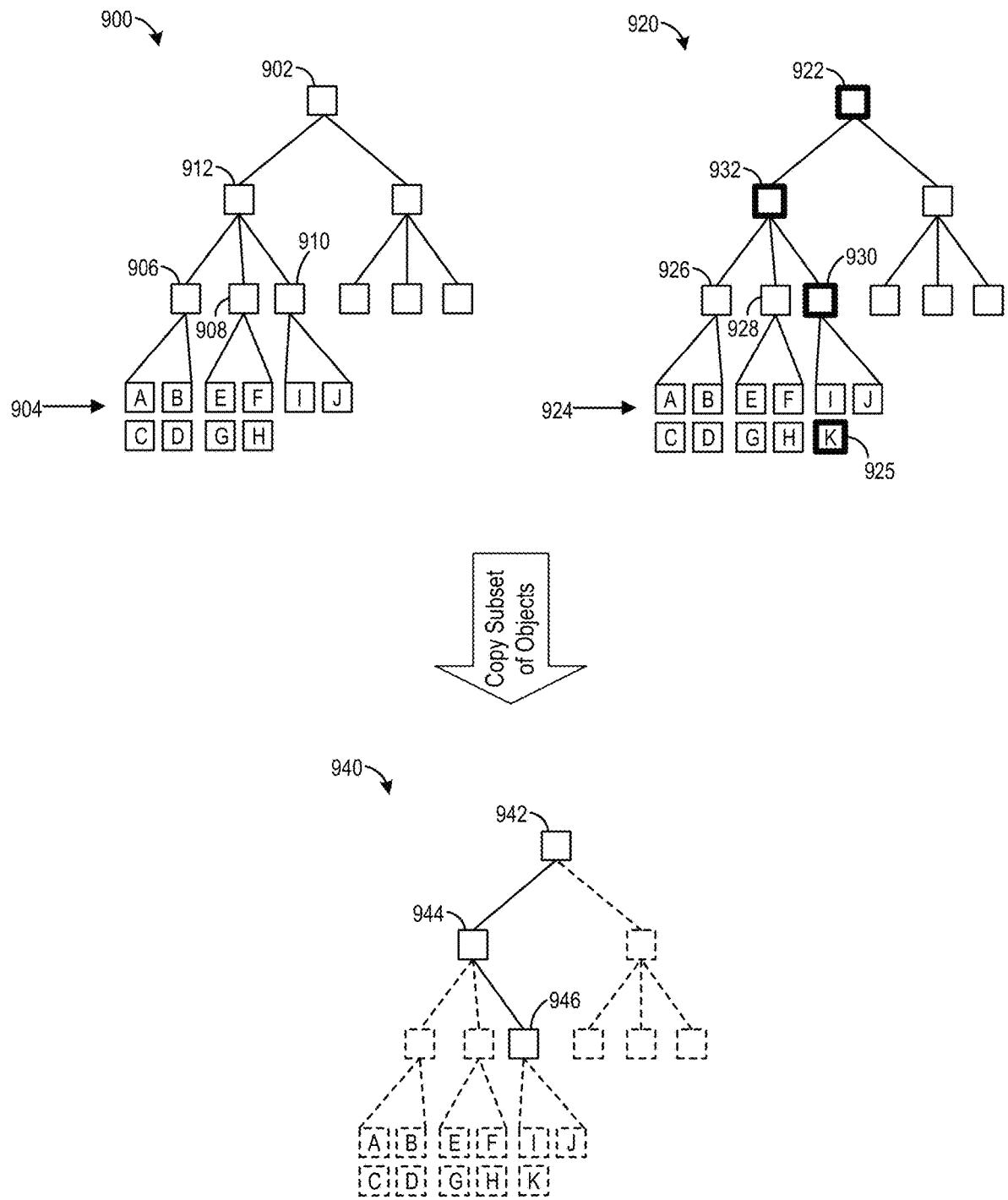
FIG. 9 depicts an illustration of a replicating new or changed objects to form a partial file system instance.

FIG. 9 illustrates an example of performing method 800 via execution of instructions 706-714. The number of branches and levels in the file system instances depicted in FIG. 9 are for illustration purposes only. Greater or fewer number of branches and levels may exist in other example file system instances.

A snapshot 900 of a source file system instance at a past point in time (T1) includes a first root signature 902. Data objects 904 relate hierarchically up to the first root signature 902 through metadata objects 906, 908, 910, 912. A snapshot 920 of the source file system instance at another past point in time (T2) or at the current point in time (T0) includes a second root signature 922.

In snapshot 900, leaf metadata object 910 contains signatures for data objects with content I and J. Compared to leaf metadata object 910, leaf metadata object 930 of snapshot 922 additionally contains a signature for new data object with content K. Since the addition of the signature for data object K changes the content of leaf metadata object 930, the content-based signatures of objects 910 and 930 differ (a similar principle applies if instead I or J were modified or deleted). Similarly, the content and signatures of objects 932, 922 thus differ from objects 912, 902, respectively. The changed or new objects 925, 930, 932, 922 are depicted in bold lines.

Changed or new metadata objects 930, 932, 922 are replicated to a target system to form a partial file system instance 940 having objects 946, 944, 942, depicted in solid lines. Unchanged objects between snapshots 900 and 920 are not replicated to the partial file system instance 940, as illustrated by objects depicted in dashed lines. In some implementations, changed or new metadata objects but not data objects are replicated (such as data object 925). In other implementations, data objects may be replicated.

Figure 10:
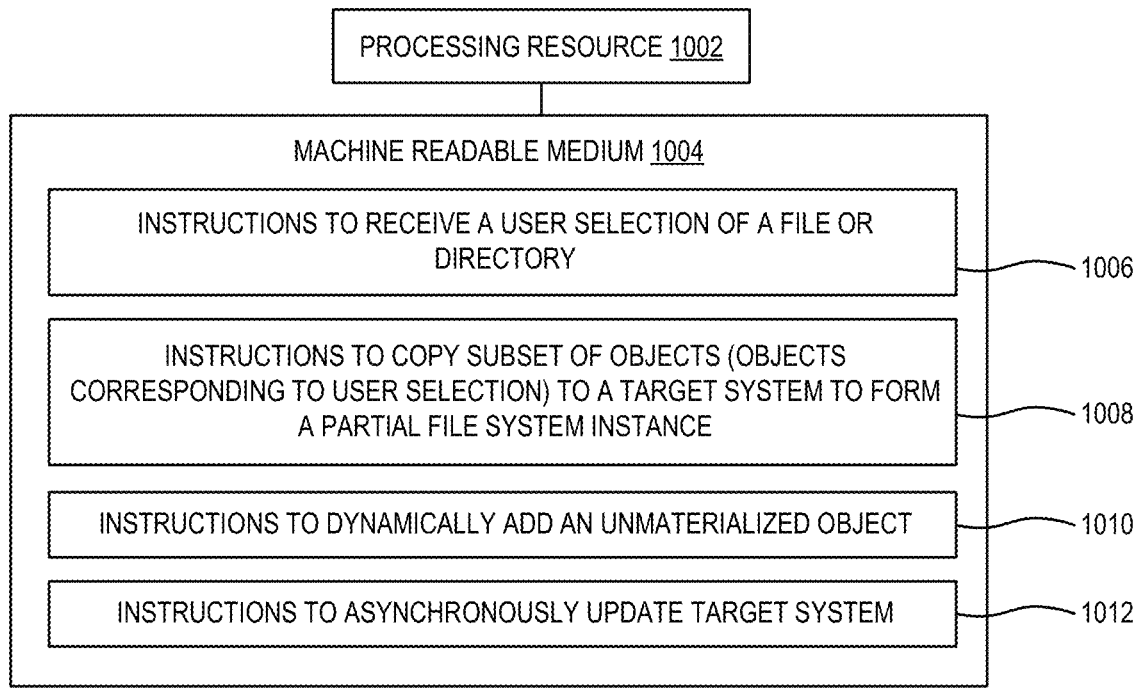
FIG. 10 is a block diagram depicting a machine readable medium encoded with example instructions to replicate objects corresponding to a user selection of a file or directory to form a partial file system instance.

FIG. 10 depicts a processing resource 1002 coupled to a non-transitory machine readable medium 1004 encoded with example instructions 1006, 1008, 1010, 1012. The processing resource 1002 and medium 1004 may be implemented on the source system 110 and/or the target system 120. The instructions of FIG. 10 may be an implementation of generating a partial file system instance on a target system.

Instructions 1006, when executed, cause the processing resource 1002 to to receive a user selection of a file or directory of the source system 110. Instructions 1006 may identify one or more objects of the source file system instance 118 that correspond to the user selected file or directory. For example, a user selected file or directory may be passed to instruction 1006 as an inode of a file protocol namespace of the source system 110. In some implementations, inodes of a file protocol namespace may map to respective objects in the data virtualization platform's file system instance 114, and those objects form subtrees within the file system instance having metadata objects that reference the data objects comprising the files or directories identified by the inodes. The "root" of a subtree may be the object representing the inode.

Instructions 1008, when executed, cause the processing resource 1002 to include, in a subset of objects to be replicated, objects of the source file system instance 118 that correspond to the user selection. For example, the subset of objects may include the metadata objects of a subtree whose root object maps to the inode of the user selected file or directory, as well as metadata objects traversed in the source file system instance 118 to reach that subtree. Instructions 1008 then causes the processing resource 1002 to replicate the subset of objects to a target system 120 to form a partial file system instance 128, in a manner similar to instructions 206 for example. Instructions 712 and 714 may be analogous in many respects to instructions 208 and 210 respectively.

Figure 11:
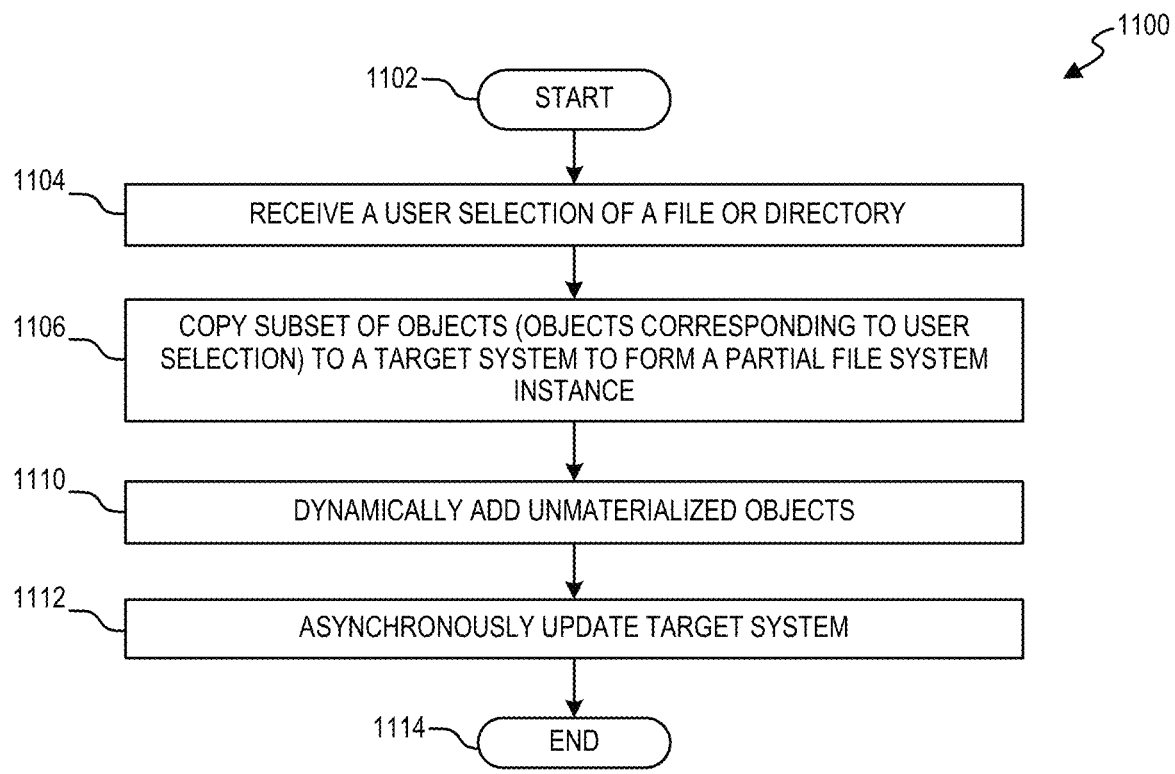
FIG. 11 is a flow diagram depicting an example method that copies objects corresponding to a user selection of a file or directory to form a partial file system instance.

FIG. 11 is a flow diagram depicting an example method 1100. Method 1100 may be performed by execution of the instructions of medium 1004 by processing resource 1002.

Method 1100 begins at block 1102 and continues to block 1104, where a user selection of a file or directory of source system is received. In particular, the user selection may be passed to the data virtualization platform of the source system as an inode number, and the data virtualization platform may identify metadata and data objects of the source file system instance associated with that inode number. The identified metadata objects and/or data objects may be included in a subset of objects to be replicated to the target system.

At block 1106, the subset of objects, including objects corresponding to the selected file or directory, may be copied to the target system to form a partial file system instance. At block 1110, unmaterialized objects are dynamically added to the rebuilt partial file system instance in a manner analogous to block 306. At block 1112, the target system is asynchronously updated from the source file system instance in a manner analogous to block 308. Method 1100 ends at block 1114.

Figure 12:
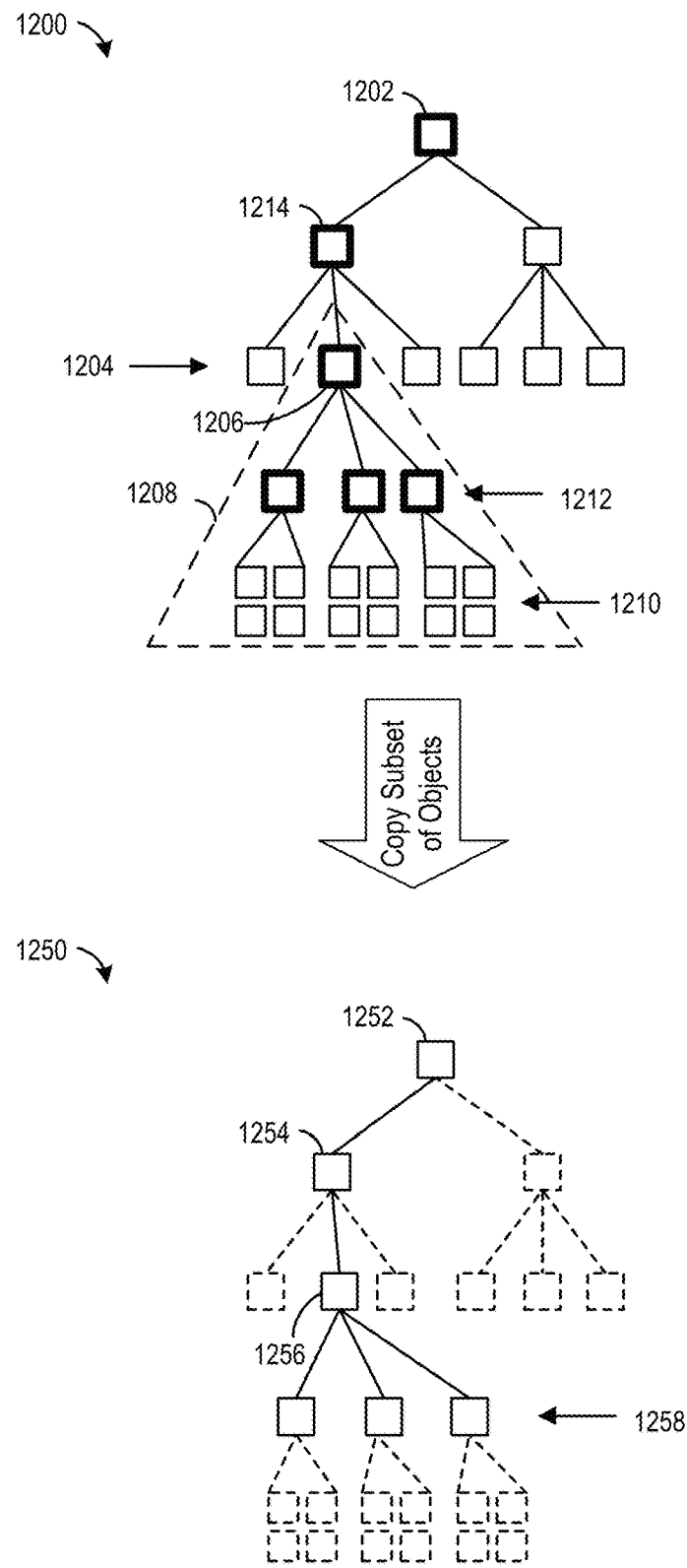
FIG. 12 depicts an illustration of a replicating new or changed objects to form a partial file system instance.

FIG. 12 illustrates an example of executing method 1100 via execution of instructions 1006-1012. The number of branches and levels in the file system instances depicted in FIG. 12 are for illustration purposes only. Greater or fewer number of branches and levels may exist in other example file system instances.

A source file system instance 1200 with root signature 1202 may exist on a source system. The source file system instance may include a special level of metadata objects 1204 that each map to an inode number of the file protocol namespace accessible by an operating system of the source system. In the illustration of FIG. 12, a user selection is associated with an inode that maps to object 1206. A subtree 1208 (depicted as a dashed triangle) with a root at object 1206 (inode map object), data objects 1210, and leaf metadata objects 1212 thus correspond to the selected file or directory. Moreover, object 1214 and file system instance root object 1202 are also associated with the subtree 1208, in that those objects are traversed in order to read the subtree 1208. Objects associated with the user selection are depicted in FIG. 12 in bold lines.

Objects 1202, 1214, 1206, 1212 of the source file system instance 1200 are replicated from the source system to a target system to form a partial file system instance 1250 comprising objects 1252, 1254, 1256, 1258 (objects in solid lines). In some implementations, data objects 1210 also may be replicated to the target system. In some implementations, other objects of the source file system instance 1200 that do not correspond to the user selected file or directory are not replicated, and such unmaterialized objects of the partial file system instance 1250 are depicted in dashed lines.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A non-transitory machine readable medium storing instructions executable by a processing resource, the non-transitory machine readable medium comprising:
   instructions to select a subset of metadata objects of a source file system instance on a source system to be included in an initial replication, wherein the source file system instance is arranged as a hierarchical object tree that includes a plurality of data objects and a plurality of metadata objects, wherein each of the subset of metadata objects is a leaf metadata object in the hierarchical object tree and is selected based on at least one characteristic of the subset of metadata objects, and wherein the initial replication does not include any of the plurality of data objects of the source file system instance;
   instructions to perform the initial replication of the subset of metadata objects from the source file system instance on the source system to a target system to form a partial file system instance on the target system comprised of the subset of metadata objects, wherein the initial replication of the subset of metadata objects excludes a first metadata object that is stored in the source file system instance, wherein each metadata object of the plurality of metadata objects of the source file system instance is identified by a signature based on content of the each metadata object, and wherein the plurality of metadata objects exhibit a hierarchical relationship to a root metadata object in the source file system instance;
   instructions to, subsequent to the initial replication of the subset of metadata objects from the source file system instance to form the partial file system instance on the target system, dynamically add the first metadata object to the partial file system instance by replicating the first metadata object from the source file system instance to the target system;
   instructions to asynchronously update the target system from the source file system instance based on a comparison of the partial file system instance to the source file system instance; and
   instructions to rebuild at least one parent metadata object of the partial file system instance by computing signatures from the subset of metadata objects using a pre-defined branching factor, wherein the at least one parent metadata object is located at a higher level than the subset of metadata objects in the hierarchical object tree.

2. The non-transitory machine readable medium of claim 1, wherein the instructions to replicate the subset of metadata objects includes:
   instructions to perform tree differencing logic between a first root signature of the source file system instance at a first point in time and a second root signature of the source file system instance at a second point in time and based on hierarchical rollup property to identify changed or new metadata objects in the source file system instance at the second point in time relative to the source file system instance at the first point in time; and
   instructions to include the changed or new metadata objects in the subset of metadata objects to be replicated.

3. The non-transitory machine readable medium of claim 2, wherein the source file system instance at the first point in time is a snapshot of the source file system instance at a past point in time, and the source file system instance at the second point in time is the source file system instance presently.

4. The non-transitory machine readable medium of claim 1, further comprising instructions to receive a user selection of a file or directory,
   wherein the subset of metadata objects of the source file system instance corresponds to the user selection.

5. The non-transitory machine readable medium of claim 1, wherein the asynchronous update creates a new partial file system instance at the target system according to a time-based policy.

6. The non-transitory machine readable medium of claim 1, wherein the source system is located at an edge of a network, and the target system is located at a core of the network.

7. The non-transitory machine readable medium of claim 1, further comprising instructions to:
   subsequent to the initial replication of the subset of metadata objects, detect a first operation at the target system to access the first metadata object; and
   in response to a detection of the first operation at the target system, dynamically add the first metadata object to the partial file system instance.

8. A method comprising:
   selecting a subset of metadata objects of a source file system instance on a source system to be included in an initial replication, wherein the source file system instance is arranged as a hierarchical object tree that includes a plurality of data objects and a plurality of metadata objects, wherein each of the subset of metadata objects is a leaf metadata object in the hierarchical object tree and is selected based on at least one characteristic of the subset of metadata objects, and wherein the initial replication does not include any of the plurality of data objects of the source file system instance;
   performing the initial replication of the subset of metadata objects from the source file system instance on the source system to a target system by copying the subset of metadata objects from the source file system to the target system to form a partial file system instance on the target system comprised of the subset of metadata objects, wherein the initial replication of the subset of metadata objects excludes a first metadata object that is stored in the source file system instance, wherein each metadata object of the plurality of metadata objects of the source file system instance is identified by a signature based on content of the each metadata object, and wherein the plurality of metadata objects exhibit a hierarchical relationship to a root metadata object in the source file system instance;
   subsequent to the initial replication of the subset of metadata objects from the source file system instance to form the partial file system instance on the target system, dynamically adding the first metadata object to the partial file system instance by copying the first metadata object from the source system to the target system;
   asynchronously updating the target system from the source file system instance based on a comparison of the partial file system instance to the source file system instance; and
   rebuilding at least one parent metadata object of the partial file system instance by computing signatures from the subset of metadata objects using a pre-defined branching factor, wherein the at least one parent metadata object is located at a higher level than the subset of metadata objects in the hierarchical object tree.

9. The method of claim 8, further comprising:
   performing tree differencing logic between a first root signature of the source file system instance and a second root signature of the source file system instance and based on hierarchical rollup property to identify changed or new metadata objects in the source file system instance at the second point in time relative to the source file system instance at the first point in time; and
   including the changed or new metadata objects identified by the tree differencing logic in the subset of metadata objects to be copied to the target system to form the partial file system instance.

10. The method of claim 9, wherein the first root signature represents a snapshot of the source file system instance at a past point in time, and the second root signature represents the source file system instance in a present state.

11. The method of claim 8, wherein the subset of metadata objects of the source file system instance corresponds to a file or directory selection received from user input.

12. The method of claim 8, where the asynchronous update creates a new partial file system instance at the target system according to a time-based policy.

13. A system comprising:
   a source system having a first object-based data virtualization platform that includes a first file system instance, wherein the first file system instance is arranged as a hierarchical object tree comprising a plurality of data objects and a plurality of metadata objects, the plurality of metadata objects identifiable by content-based signatures;
   a target system having a second object-based data virtualization platform and being in communication with the source system via a network;
   a processing resource; and
   a machine readable medium storing instructions that, when executed by the processing resource, cause the processing resource to:
      select a subset of metadata objects of the first file system instance on the source system to be included in an initial replication, wherein each of the subset of metadata objects is a leaf metadata object in the hierarchical object tree and is selected based on at least one characteristic of the subset of metadata objects, and wherein the subset of metadata objects does not include any of the plurality of data objects of the first file system instance;

perform the initial replication of the subset of metadata objects from the first file system instance to the target system to form a second file system instance on the target system that is a partial version of the first file system instance, wherein the initial replication of the subset of metadata objects excludes a first metadata object that is stored in the first file system instance, subsequent to the initial replication of the subset of metadata objects from the first file system instance to form the second file system instance on the target system, dynamically add the first metadata object to the second file system instance by replicating the first metadata object from the first file system instance, upon a demand for the first metadata object, asynchronously update the target system based on a comparison of the second file system instance and the first file system instance; and rebuild at least one parent metadata object of the second file system instance by computing signatures from the subset of metadata objects using a predefined branching factor, wherein the at least one parent metadata object is located at a higher level than the subset of metadata objects in the hierarchical object tree.

14. The system of claim 13, wherein the source system is located at an edge of the network, and the target system is located at the core of the network.

15. The system of claim 13, wherein the instructions, when executed, cause the processing resource to:
perform tree differencing logic between a first root signature of the source file system instance at a first point in time and the second root signature of the source file system instance at a second point in time and based on hierarchical rollup property to identify changed or new metadata objects in the first file system instance at the second point in time relative to the first file system instance at the first point in time, and
include the changed or new metadata objects in the subset of metadata objects to be replicated.

16. The system of claim 13, wherein the subset of metadata objects of the first file system instance correspond to a file or directory selection received from user input.

17. The system of claim 13, wherein the instructions, when executed, cause the processing resource to:
subsequent to the initial replication of the subset of metadata objects, detect a first operation at the target system to access the first metadata object; and
in response to a detection of the first operation at the target system, dynamically add the first metadata object to the partial file system instance.

* * * * *